(No Model.)
J. BURKE & O. L. McKUNE.
ATTACHMENT FOR PUMP PLUNGERS.
No. 534,195.
Patented Feb. 12, 1895.
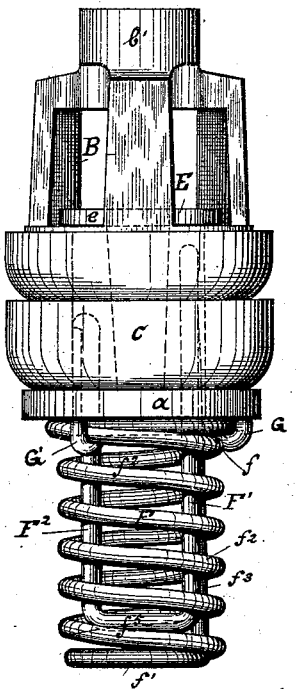
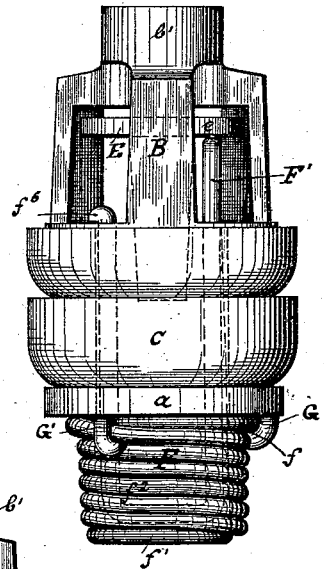
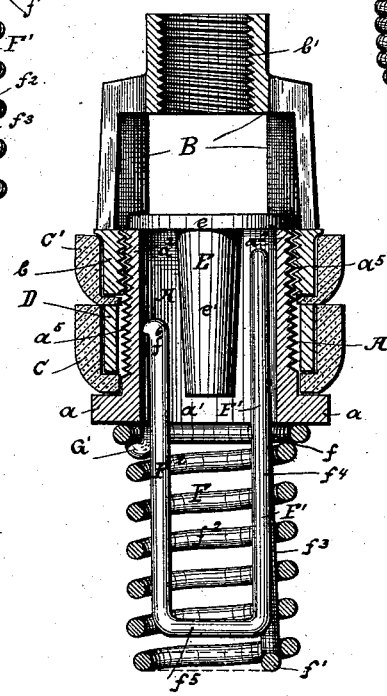
Witnesses:
Emil Reichelt
Fred May
Inventors
John Burke
Orlando L. McKune
By Reichelt & Oltsch,
Atty's

UNITED STATES PATENT OFFICE.

JOHN BURKE AND ORLANDO L. McKUNE, OF NILES, MICHIGAN.

ATTACHMENT FOR PUMP-PLUNGERS.

SPECIFICATION forming part of Letters Patent No. 534,195, dated February 12, 1895.

Application filed April 11, 1894. Serial No. 507,195. (No model.)

*To all whom it may concern:*

Be it known that we, JOHN BURKE and ORLANDO L. McKUNE, citizens of the United States, and residents of Niles, in the county of Berrien and State of Michigan, have invented certain new and useful Improvements in Attachments for Pump-Plungers, of which the following is a specification.

Our invention relates to an attachment for pump plungers or valves, especially adapted for deep wells and working within long pipe sections coupled together, the object of the invention being to easily lift the plunger valve and hold it (open) when it is required to lift or remove the plunger from the pipe for removing the packing or otherwise repairing the same. The valve thus being held open will relieve the plunger of the weight of the column of water within the pipe which would otherwise press with such force upon the packing of the plunger as to unduly spread the packing and cause it to engage with and be intercepted by the coupling joints of the pipe.

The invention consists generally in a spring actuated catch and lift rod secured to or supported upon the plunger to be pushed against the valve to lift it when the plunger is shoved down below its working position by contact with the lower check valve or a fixed part of the pipe, and engage with a fixed portion of the plunger to thus hold the valve open until it is lifted out of the pipe.

In the accompanying drawings which illustrate our invention: Figure 1, is a side elevation of a plunger and its valve of ordinary construction with our attachment applied thereto; Fig. 2, a similar view of the same with our attachment holding the valve open ready to withdraw the plunger from the pipe, and Fig. 3, a vertical longitudinal section of the plunger with its valve and our attachment as shown in Fig. 1.

The plunger comprises a cylindrical valve casing A, having an outer flange a, and an exterior screw thread $a^5$ upon the upper end of which is fitted the nut b, of a valve cage B, for securing the packing to the valve casing A, and the upper end of the said valve cage having a screw thread butt b', to which the lower end of the plunger rod is attached, all in a well known manner, the lower packing ring C, being held between the lower end of a follower D, and the valve casing flange a, and the upper packing ring C', being held between the upper end of the follower and the lower end of the nut b, which is screwed down sufficiently to hold both packing rings and follower securely at their inner peripheral edges, between the said nut, follower and flange projecting from the bottom of the valve casing.

The valve E, is of the ordinary pump check valve pattern, having a valve disk e, and a pendent stem e', loosely fitted within the casing A, and cage B, the under side of the rim of the valve disk being seated upon the upper end $a^2$, of the valve casing.

The attachment shown in the drawings and representing the preferred simplest, most inexpensive and effective form of our invention, comprises a continuous spring wire F, the upper horizontal coil f, of which passes through eyes G, G', upon the under side of the valve casing to provide a secure base for the attachment, and the bottom horizontal coil f', of the wire connected with the top coil f, by a spiral section $f^2$ of the wire, and the end $f^3$, of the horizontal coil section f', being bent vertically therefrom, to extend against the inner side of the coil $f^2$, and the inner side of the valve casing A, to a point very near the under side of the valve disk e, and is then turned down parallel with the section $f^3$, which together with the said return section $f^4$ provides a strong rod F', for lifting the valve as hereinafter described, the lower end of the return section $f^4$, being carried diametrically across the bottom of the coil $f^2$, to the opposite side thereof at section $f^5$, and again turned vertically and bent outwardly at its upper end $f^6$, to form a catch lever $F^2$, which will press with sufficient elasticity against the inner side of the valve casing to spring over and catch the top rim of the valve seat $a^2$, of the casing and hold the valve open when it has been lifted by the contact and pressure of the bottom coil f', of the spring attachment F, upon the lower check, or foot valve of the pipe or upon some other fixed inwardly projecting portion of the pump pipe.

The catch lever $F^2$, is shorter than the push rod F', in order that the valve may be lifted and held up above the seat $a^2$, a sufficient distance to permit the column of water in the stand pipe to freely pass through the plunger when the valve is held open by the said catch lever. The catch lever F² and push rod F' are held against the inner side of the valve casing by their own tension and serve to give rigidity to the entire attachment while the valve is being lifted under the great pressure of the water above it.

It is obvious that the shape and construction of the attachment may be modified in various ways without departing from our invention.

What we claim as new, and desire to secure by Letters Patent, is—

1. A pump plunger attachment, comprising a push rod section adapted to raise the valve off of its seat by the compression of a spiral spring formed integral therewith, and a catch rod section formed integral with said spring and adapted to engage with the plunger valve casing and hold the said spring in a compressed position, substantially as described.

2. A pump plunger attachment comprising the spiral spring section secured to the under side of the valve casing, the push rod section, and the catch lever section made integral and combined and arranged, substantially as and for the purpose described.

In testimony that we claim the foregoing as our invention we have signed our names in the presence of two subscribing witnesses.

JOHN BURKE.
ORLANDO L. McKUNE.

Witnesses:
ROBERT HOFFMAN,
FRED MAY.